3,641,245
//! SYNERGISTIC INSECTICIDAL MIXTURE CONTAINING BENZOTHIAZOLINES AND INSECTICIDAL USE OF THE MIXTURE
//! Peter F. Epstein, Prairie Village, Kans., assignor to Stauffer Chemical Company, New York, N.Y.
//! No Drawing. Filed Dec. 27, 1968, Ser. No. 787,576
//! Int. Cl. A01n 9/12
//! U.S. Cl. 424—188                            4 Claims

ABSTRACT OF THE DISCLOSURE

Synergistic mixture of compounds of the formula

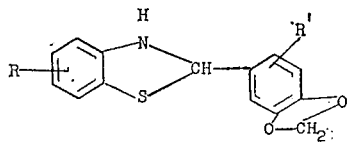

in which R and R' are independently hydrogen, halogen, lower alkyl, lower alkenyl, or lower alkoxy with aryl N-methyl carbamates, pyrethrum, or allethrin, and the use thereof for controlling insects.

---

This invention relates to synergistic mixtures of certain benzothiazolines with aryl N-methyl carbamates, pyrethrum, or allethrin and their use as insecticides.

The benzothiazolines of the present invention that are useful to form synergistic insecticides with certain known insecticides are those of the formula:

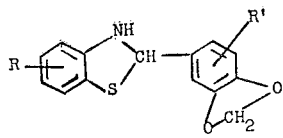

in which R and R' are independently hydrogen; halogen; lower alkyl, preferably having 1 to 4 carbons; lower alkenyl, preferably having 2 to 4 carbon atoms; or lower alkoxy, preferably 1 to 4 carbon atoms.

The term halogen when used to describe the benzothiazolines means chlorine, bromine, iodine and fluorine. The term lower alkyl means alkyl having 1 to 6 carbons, the term lower alkoxy means alkoxy having 1 to 6 carbon atoms, and the term lower alkenyl means alkenyl having 2 to 6 carbon atoms.

The following is a listing of representative benzothiazoline compounds of this invention:

2-(3,4-methylenedioxy-5-chlorophenyl)-benzothiazoline
2-(3,4-methylenedioxy-6-methylphenyl)-benzothiazoline
2-(3,4-methylenedioxy-2-methoxyphenyl)-benzothiazoline
2-(3,4-methylenedioxy-5-allylphenyl)-benzothiazoline
2-(3,4-methylenedioxyphenyl)-5-methyl benzothiazoline
2-(3,4-methylenedioxyphenyl)-6-chloro benzothiazoline
2-(3,4-methylenedioxyphenyl)-5-methoxy benzothiazoline The aryl N-methyl carbamates of this invention are known insecticides and are represented by the general formula:

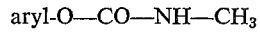

aryl-O—CO—NH—CH₃ in which aryl is naphthyl, 2,3-dihydro-2,2-dimethyl-7-benzofuraryl and substituted phenyl in which the substituents are alkyl having 1 to 6 carbon atoms, preferably methyl; chloro; dimethyl amino; alkoxy having 1 to 6 carbon atoms, preferably isopropoxy; alkyl thio having 1 to 6 carbon atoms, preferably methyl. The above substituents can be either mono, di, or tri substituted on the phenyl radical and they can be the same or mixed.

Illustrative of such compounds are:
1-naphthyl N-methyl carbamate,
3,4,5-trimethyl phenyl N-methyl carbamate,
o-isopropoxyphenyl N-methyl carbamate,
m-(1-methylbutyl) phenyl N-methylcarbamate,
m-(1-ethylpropyl) phenyl N-methyl carbamate,
4-(methylthio)-3,4 xylyl N-methyl carbamate,
o-isopropoxyphenyl N-methyl carbamate,
4-dimethylamino-3-tolyl N-methyl carbamate,
4-(N,N-dimethylamino)-3,4-xylyl N-methyl carbamate,
6-(chloro)-3,4 xylyl N-methyl carbamate.

Pyrethrum is a well-known insecticide, having been described in numerous publications. The insecticidal properties of pyrethrum have been known since about 1800. It can be prepared from the ground flowers of *Chrysanthemum cinergriae folium* and *C. coccineum*. The preparation originated in the Transcaucasus region of Asia where it was used as a flea and louse powder. A century of chemical investigation has disclosed that the insecticidal properties are due to five esters, the pyrethrins I and II, the cinerins I and II, and jasmolin II, which are present in the flowers, mostly in the achenes ranging from 017 to as 3% in selected strains. The structure of pyrethrun esters is as follows:

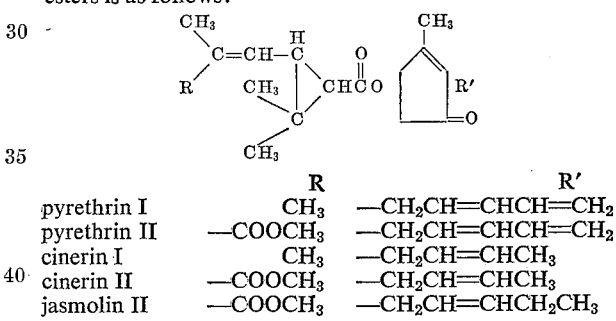

|              | R       | R'                  |
|--------------|---------|---------------------|
| pyrethrin I  | CH₃     | —CH₂CH=CHCH=CH₂    |
| pyrethrin II | —COOCH₃ | —CH₂CH=CHCH=CH₂    |
| cinerin I    | CH₃     | —CH₂CH=CHCH₃       |
| cinerin II   | —COOCH₃ | —CH₂CH=CHCH₃       |
| jasmolin II  | —COOCH₃ | —CH₂CH=CHCH₂CH₃    |

These esters have asymmetric carbon atoms and double bonds in both alcohol and acid moieties. The naturally occurring forms are the d-trans acid esters of the d-cis alcohols. The active principles are extracted from the ground flowers by petroleum ether, ethylene dichloride, or other organic solvent, and freed from wax by absorption on carbon to product 90–100% pyrethrins. These materials are highly unstable to the action of light, air, moisture, and alkali, and residues deteriorate very rapidly after application.

Allethrin is also a well-known insecticide. Its chemical name is dl-2-allyl-3-methylcyclopent-2-en-4-ol-1-onyl dl-cis-trans-chrysanthemate (I). The commercial product is a clear brownish liquid d²⁰ 1.005–1.015, containing 75–95% of eight individual optical and geometric isomers whose identity and abundance are as follows:

ALLETHRIN ISOMERS WITH THEIR ABUNDANCE

| Allylrethronyl portion | Chrysanthemate portion | Percent |
|---|---|---|
| l- | d-trans- | 12.4 |
| d- | l-trans- | 12.4 |
| d- | d-trans- | 22.8 |
| l- | l-trans | 22.8 |
| l- | d-cis | 8.0 |
| d- | l-cis | 8.0 |
| d- | d-cis- | 6.8 |
| l- | l-cis- | 6.8 |

The proportion of each of the benzothiazoline according to this invention may vary within wide limits, for example, it can vary between 0.5 to 10 part by weight of the benzothiazoline compound to 1 part of aryl N-methyl carbamate, pyrethrum or allethrin component. However, to obtain an appreciable synergistic effect, it is particularly advantageous to use from 1 to 5 parts of the benzothiazoline compound to 1 part aryl of N-methyl carbamate, pyrethrum, or allethrin component. If, for example, 2-(3,4-methylenedioxyphenyl)-4,5 benzothiazoline (A) is used, a very distinct synergistic activity is found with 1 part of this compound and 1 part of 1-naphthyl N-methyl carbamate (B). If the proportions of product A are increased, for example, to 5 parts to 1 part of B, the efficacy of the combination which is already more active than product B alone, is enhanced, the efficacy of the mixture being 12 times greater than that of product B used alone.

The insecticidal compositions hereof may be applied in different forms, e.g., as mixtures with water-wettable powders or in suspensions, solutions or emulsions, with inert liquids. The mixtures may be applied by any suitable technique, e.g., by vaporization, coating or impregnation of the materials to be protected. When the compositions hereof are employed in solution form, they may be dissolved in one or more inert solvents, such, for example, as aromatic hydrocarbons, e.g. benzene, toluene, xylene, Decalin; chlorinated hydrocarbons, such as carbon tetrachloride, perchloroethylene; esters or ethers, e.g., alkyl propionates or acetates, dioxane, tetrahydrofuran; ketones, such as acetone, methyl-ethyl ketone, cyclohexanone, etc. Such solutions contain from 0.5 to 20% by weight of the active mixture, preferably from about 1 to 10% by weight of same.

For some applications, it is preferable to incorporate the insecticidal compositions hereof in an emulsion, a conventional surface active agent being employed, to emulsify the mixture in an aqueous external phase.

Alternatively, the mixture may be provided as a water-wettable powder admixed with suitable support, such as talc, kaolin, silica gel, tec., and thus impregnated with from 0.05 to 5% of an appropriate surface active agent. The resulting pulverulent mixture, which generally contains from about 10 to 95% by weight of the active mixture, may be employed in dry form, without the addition of a surfactant, and without dilution with water.

In general, the active mixture may be supplied to users in the form of compositions containing from 0.5 to 99.5% of the mixture, the balance of such compositions comprising one or more of the hereinabove mentioned inerts, e.g., solvents, liquid dispersants, water, inorganic pulverulent fillers, surfactants, or the like.

The benzothiazolines of this invention can be prepared by reacting a compound of the formula:

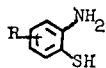

in which R is as previously defined with a compound of the formula

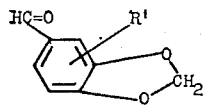

in which R' is as previously defined.

Preferably, the reaction is carried out in a solvent such as benzene by heating about equal molar amounts of the two compounds at reflux. The reaction products are normally solids and can be recovered from the reaction mixture by conventional means.

Preparation of the compounds of this invention is illustrated by the following specific example.

EXAMPLE I 2-(3,4-methylenedioxyphenyl)-benzothiazoline

A mixture of piperonal (30.0 g.; 0.2 M.) and o-amino benzene thiol (25.0 g.; 0.2 M.) in 200 ml. benzene is heated under reflux using a Dean Stark tube to collect the water formed. When the theoretical amount of water is collected, the mixture is stripped to yield 48.8 g. of a yellow solid, M.P. 105–112.5° C. The solid is purified twice in ethyl alcohol to give a solid, M.P. 121–123° C.

The I.R. analysis of the pure product corresponds to the structure of 2-(3,4-methylenedioxyphenyl)-benzothiazoline:

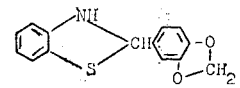

Calc. for $C_{14}H_{11}NO_2S$ (percent): C, 65.35; H, 4.31; S, 12.46. Found (percent): C, 65.20; H, 4.26; S, 12.39.

Insecticide synergism test

Stock solutions containing 100 μg./ml. of the toxicant aryl N-methyl carbamate, pyrethrum or allethrin and 500 μg./ml. of the synergist (particular benzothiazoline) are prepared using appropriate solvents. Toxicant and synergist are combined in a 1 part toxicant:5 parts synergist ratio by adding equal aliquots of the stock solutions to one ml. of a 0.2% peanut oil in acetone spreading solution in a glass petri dish 60 mm. in diameter. The toxicant/synergist film residue forms in the petri dish as the solvents evaporate. The petri dishes are placed in a circular cardboard cage, closed on the bottom with cellophane and covered on top with cloth netting. Twenty-five female house flies, Musca domestica (Linn.), are introduced into the cage and the percent mortality is recorded after 48 hours. LD–50 values are expressed in terms of μg. per 25 ♀ flies. The aliquots are varied to achieve desired toxicant/synergist concentrations ranging from 100 μg. toxicant 500 μg. synergist per petri dish to that at which 50% mortality is obtained. If test compound exhibits favorable synergistic activity, tests are repeated using progressively lower toxicant/synergist ratios. The process is repeated until synergism is no longer detected. Controls are identical to the above with the exception that the synergist is omitted.

The following table shows the synergistic effect of the benzothiazoline compounds when tested with 1-naphthyl N-methyl carbamate, pyrethrum and allethrin.

The benzothiazoline shown in Example I was used as a representative benzothiazoline in the aforedescribed insecticidal synergism test and is called "Compound A" in the following table.

TABLE I.—BENZOTHIAZOLINE SYNERGIST
[LD–50 values μg./25 female H.F.]

| Compound | Unsynergized | Synergized with piperonyl butoxide 1:5 ratio | Synergized with Compound A 1:5 ratio |
|---|---|---|---|
| Pyrethrum | 2.5 | 0.78 | 1.9 |
| Allethrin | 6.0 | 3.40 | 3.3 |
| 1-naphthyl N-methyl carbamate | 100.0 | 20.00 | 8.0 |

The effectiveness of the Compound A as a synergist is shown with 1-naphthyl N-methyl carbamate at various ratios in Table I. The synergistic activity of Compound A was evaluated accordingly to the aforedescribed test procedure.

TABLE II

Effectiveness of Compound A as a synergist of 1-naphthyl N-methyl carbamate at varying ratios

[μg./25 female house flies]

| Carbamate | Compound A | Ratio | Percent mortality |
|---|---|---|---|
| 8 | 8 | 1:1 | 34 |
| 8 | 16 | 1:2 | 42 |
| 8 | 24 | 1:3 | 52 |
| 8 | 32 | 1:4 | 58 |
| 8 | 40 | 1:5 | 62 |
| 8 | | | 0 |
| | 40 | | 0 |

It will thus be seen that the present invention provides a novel composition exhibiting synergistic insecticidal properties. Since various changes may be made in the preferred embodiments of the compositions of the present invention described hereinabove without departing from the scope of this invention, it is intended that the preceding description be construed as illustrative and not as a limiting sense.

I claim:

1. A composition exhibiting synergistic insecticidal properties comprising a mixture of about 1 to 5 parts by weight of 2-(3,4-methylene dioxyphenyl)-benzothiazoline with 1 part by weight 1-naphthyl N-methyl carbamate.

2. The method of controlling insects comprising applying to the habitat thereof an insecticidally effective amount of a composition exhibiting synergistic insecticidal properties comprising a mixture of about 1 to 5 parts by weight of 2-(3,4-methylene dioxyphenyl)-benzothiazoline with 1 part by weight 1-naphthyl N-methyl carbamate.

3. A composition exhibiting synergistic insecticidal properties comprising a mixture of about 5 parts by weight of 2-(3,4-methylene dioxyphenyl)-benzothiazoline with 1 part by weight pyrethrum.

4. A composition exhibiting synergistic insecticidal properties comprising a mixture of about 5 parts by weight of 2-(3,4-methylene dioxyphenyl)-benzothiazoline with 1 part by weight allethrin.

References Cited

UNITED STATES PATENTS

| | | | |
|---|---|---|---|
| 2,755,219 | 7/1956 | Beroza | 424—306 |
| 2,764,517 | 9/1956 | Beroza | 424—306 |
| 2,773,062 | 12/1956 | Prill | 424—306 |
| 3,310,467 | 3/1967 | Kramer et al. | 424—300 |
| 3,338,783 | 8/1967 | Popjak | 424—300 |

OTHER REFERENCES

Frear, Chemistry of Pesticides (1955), pp. 159, 175.
Chemical Abstracts, vol. 46 (1952), 3885h.
Chemical Abstracts, vol. 46 (1952), 10982b.

ALBERT T. MEYERS, Primary Examiner

N. A. DREZIN, Assistant Examiner

U.S. Cl. X.R.

424—270, 300, 306